(No Model.)

D. F. STAYMAN.
JOURNAL.

No. 283,527.  Patented Aug. 21, 1883.

WITNESSES
J. R. Littell,
F. B. Noyes.

D. F. Stayman,
INVENTOR
by C. A. Snow & Co.
Attorneys.

UNITED STATES PATENT OFFICE.

DAVID FOUST STAYMAN, OF MIFFLINBURG, PENNSYLVANIA.

JOURNAL.

SPECIFICATION forming part of Letters Patent No. 283,527, dated August 21, 1883.

Application filed May 31, 1883. (No model.)

*To all whom it may concern:*

Be it known that I, DAVID F. STAYMAN, a citizen of the United States, residing at Mifflinburg, in the county of Union and State of Pennsylvania, have invented a new and useful Journal, of which the following is a specification, reference being had to the accompanying drawings.

This invention relates to journals for shafts, mandrels, and the like; and its object is to provide a simple, durable, and efficient journal that can be readily shifted longitudinally on the shaft, and fastened securely at the desired point, whereby the shaft-bearings can be moved from place to place.

Figure 1:
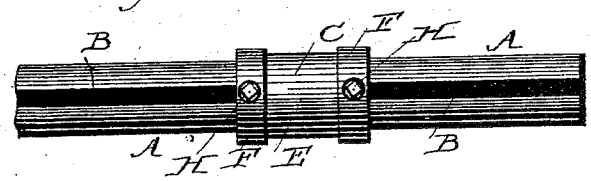
Figure 2:
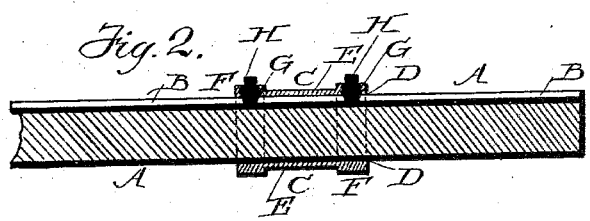
Figure 3:
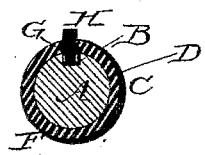
Figure 4:
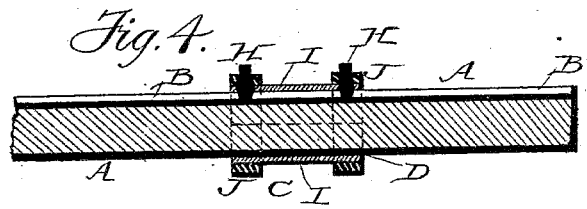

In the drawings, Figure 1 is a side view of a portion of a shaft equipped with my improved journal. Fig. 2 is a longitudinal sectional view of the same. Fig. 3 is a transverse sectional view. Fig. 4 is a longitudinal sectional view illustrating a modification.

Referring to the drawings, A designates a shaft, in the surface of which is formed a longitudinally-extending groove, B, of a length equal to the desired longitudinal movement of the journal. The journal is formed by a collar or sleeve, C, having a central bore, D, by which it is arranged on the shaft A, and formed with a central bearing periphery, E, at the ends of which the collar is enlarged to form shoulders F F, as shown. These enlarged ends F F are provided with screw-threaded perforations G, through which work set-screws H, which are arranged to enter the groove B in the shaft and bind against the bottom of the same to retain the journal-collar securely in position against displacement. By loosening these set-screws the said collar can be shifted on the shaft in either direction and to any desired point, during which movement the screws will slide in the groove in the shaft and serve as a guide to the collar.

Under some circumstances, especially when it is desired to move the journal without taking the pulleys off the shaft, or when it is desired to substitute a new journal in lieu of forming the journal-collar in one piece, it may be constructed of a central sleeve formed in halves, I I, that can be easily fitted in place on the shaft, and two end collars, J J, that will fit over the ends of this sectional sleeve and retain the halves thereof together, the screw-threaded set-screw openings being formed in these end collars and through the upper half, I, of the central sleeve, as shown at K K.

The operation and advantages of my invention will be readily understood. It is very simple and convenient, and is adapted for all kinds of machine or line shafting, mandrels, &c. My invention will obviate all the labor and trouble heretofore experienced in changing the bearings of shafts, and will avoid the necessity of removing the pulleys and shaft when it is desired to shift the journal.

I claim as my invention—

A movable shaft-journal comprising the shaft, having a longitudinally-disposed groove, the adjustable collar, forming the journal of the shaft and comprising a central bearing portion, and end portions of greater diameter, forming the shoulders, by which the shaft is secured from longitudinal displacement, a screw-threaded perforation being formed in each end portion of the journal-collar, and the binding-screws working through the end portions into the groove and binding against the bottom thereof, substantially as and for the purpose set forth.

In testimony that I claim the foregoing as my own I have hereto affixed my signature in presence of two witnesses.

DAVID FOUST STAYMAN.

Witnesses:
HORACE P. GLOVER,
J. M. STAYMAN.